United States Patent [19]

Badger et al.

[11] Patent Number: 5,606,559
[45] Date of Patent: Feb. 25, 1997

[54] SYSTEM AND METHOD FOR AN EFFICIENT ATM ADAPTER/DEVICE DRIVER INTERFACE

[75] Inventors: Ryan L. Badger, Wake Forest; Kenneth J. Barker, Cary; Paul H. Nichols; Russell E. Schroter, both of Raleigh; John K. Stacy, Cary; Mark C. Wartski, Raleigh, all of N.C.

[73] Assignee: International Business Machines Corporation, Armonk, N.Y.

[21] Appl. No.: 515,183

[22] Filed: Aug. 11, 1995

[51] Int. Cl.$^6$ .................................................. H04L 12/54
[52] U.S. Cl. ........................... 370/395; 395/872; 370/412
[58] Field of Search .............................. 395/200.13, 872, 395/874; 370/60.1, 61, 94.2, 99, 85.13, 108

[56] References Cited

U.S. PATENT DOCUMENTS

| | | | |
|---|---|---|---|
| 5,136,584 | 8/1992 | Hedlund | 370/94.1 |
| 5,274,768 | 12/1993 | Traw et al. | 395/275 |
| 5,297,139 | 3/1994 | Okura et al. | 370/60 |
| 5,521,915 | 5/1996 | Dieudonne et al. | 370/99 |
| 5,524,113 | 6/1996 | Gaddis | 370/94.2 |

*Primary Examiner*—Benedict V. Safourek
*Attorney, Agent, or Firm*—Joseph C. Redmond; Steven B. Phillips

[57] ABSTRACT

An ATM communications network includes a system processor having a device driver and a memory coupled to an adapter at an interface. Frames stored in the memory are transmitted to the network using a transmit ready queue residing in the adapter and defined by transmit control registers. The frames are linked together by descriptors and pointers to received ready lists maintained by the device driver. A transmit frame complete list is established in the system memory using the transmit control registers. An interrupt is generated by the adapter indicating when frame transmission is complete. Simultaneously, cells are received from the network and stored in system memory according to a free buffer list established by the device driver. A pointer is maintained by the device driver to the last entry of the receive free buffer list. The adapter maintains a pointer to the next buffer to be used from the receive free buffer list. A receive ready list is established by the device driver in system memory with the location indicated to the adapter via the receive control registers in the adapter. The receive data cells are reassembled into frames in buffers from the free buffer list. At completion of a received frame, the frame is added to an appropriate receive ready list. An interrupt is generated to the processor by the adapter when one or more completed frames reside on the receive ready list for transmission to the network.

17 Claims, 16 Drawing Sheets

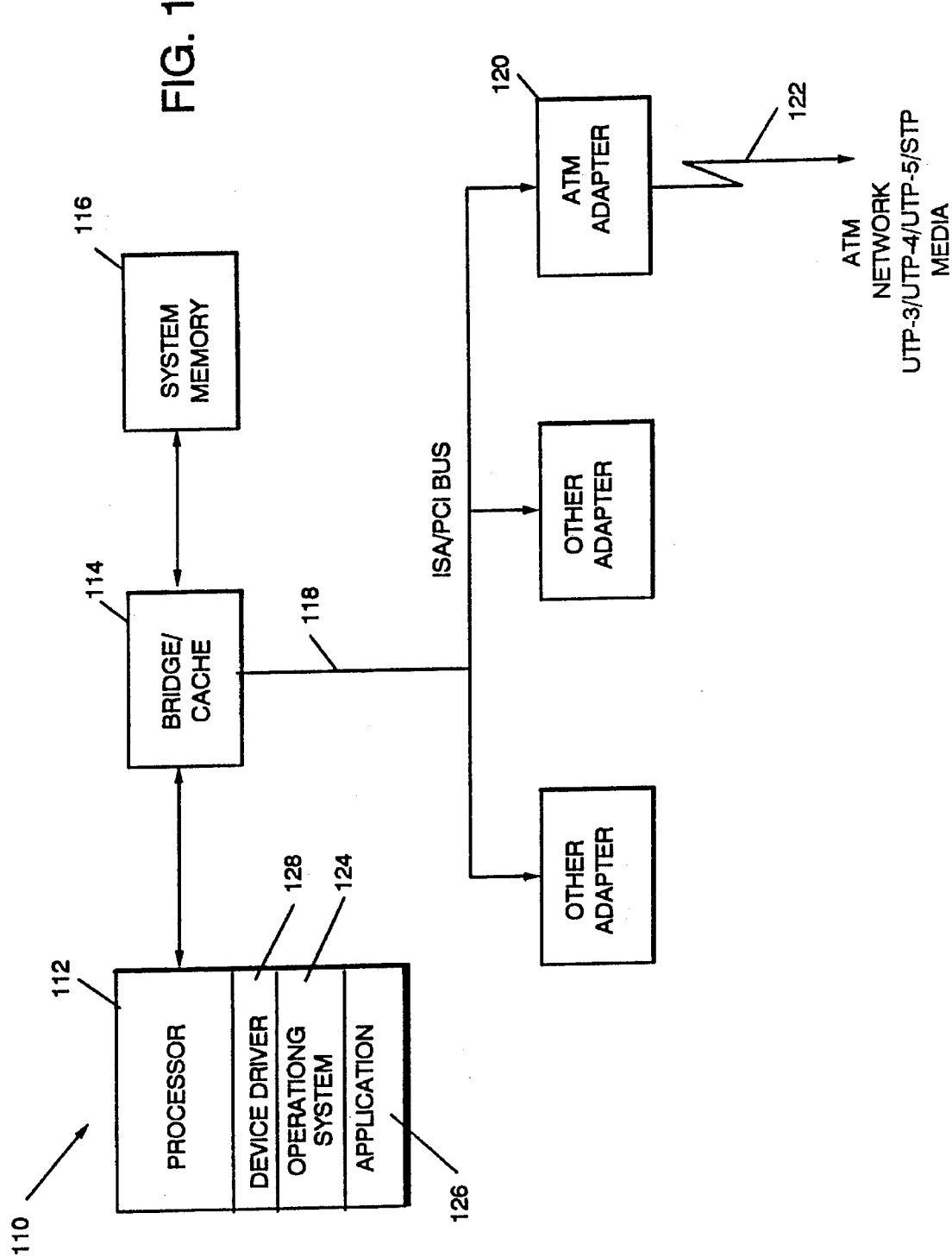

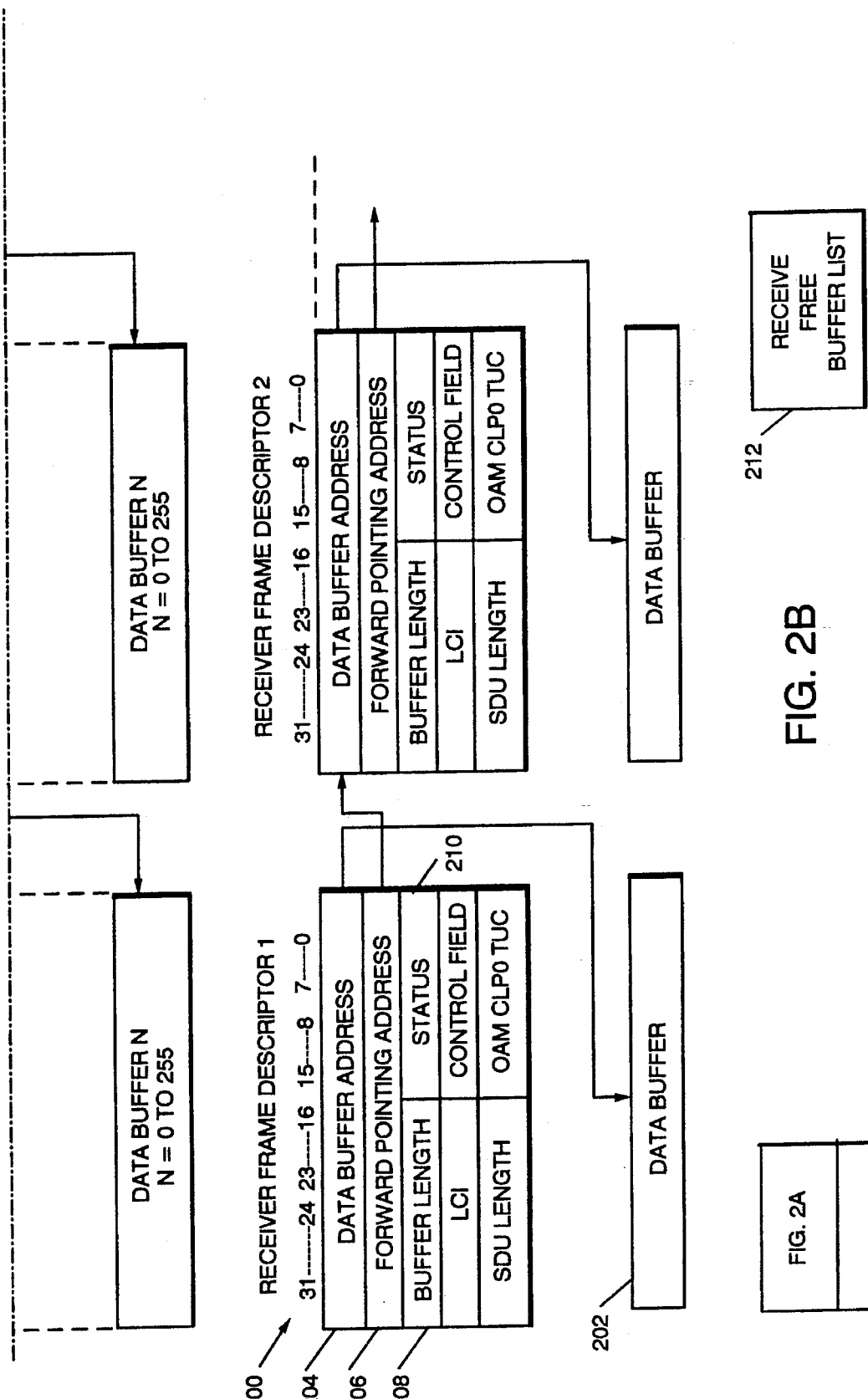

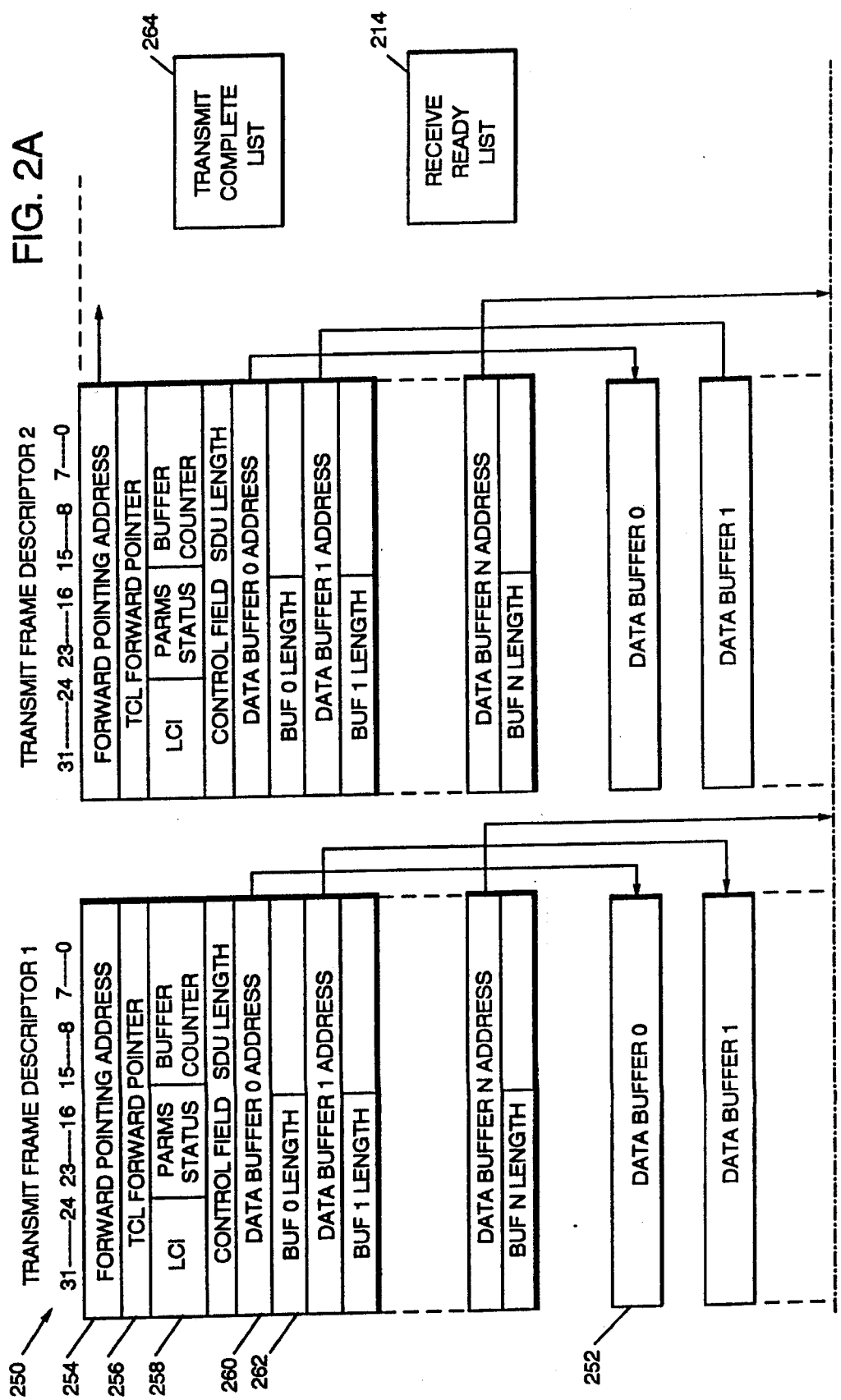

TCL LINK OF FRAME DESCRIPTORS BEFORE TRANSMITTING FRAMES. THIS LINK LIST IS LOCATED IN THE SYSTEM MEMORY.

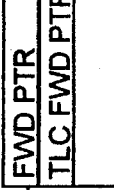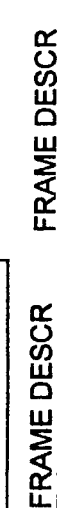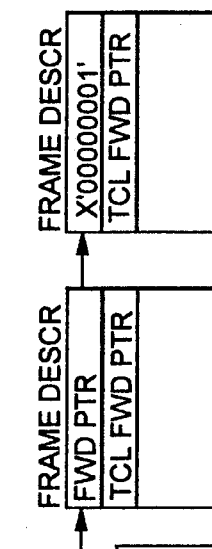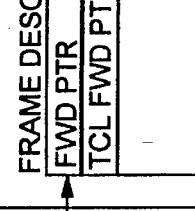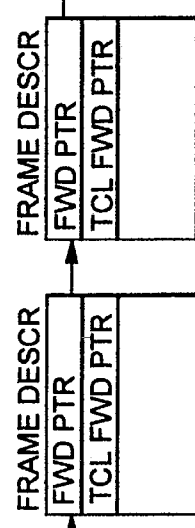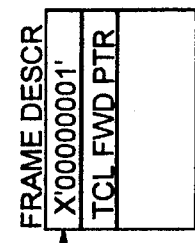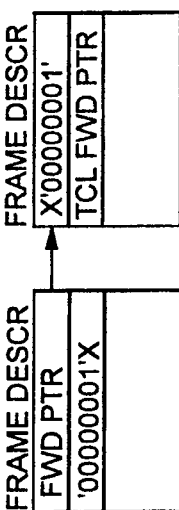
FIG. 7
TLC LINK OF FRAME DESCRIPTORS AFTER TRANSMITTING FRAMES IN THE FOLLOWING ORDER: LCX, LCY, LCX, LCZ. THIS LINK LIST IS LOCATED IN SYSTEM MEMORY.

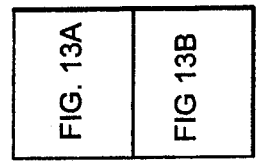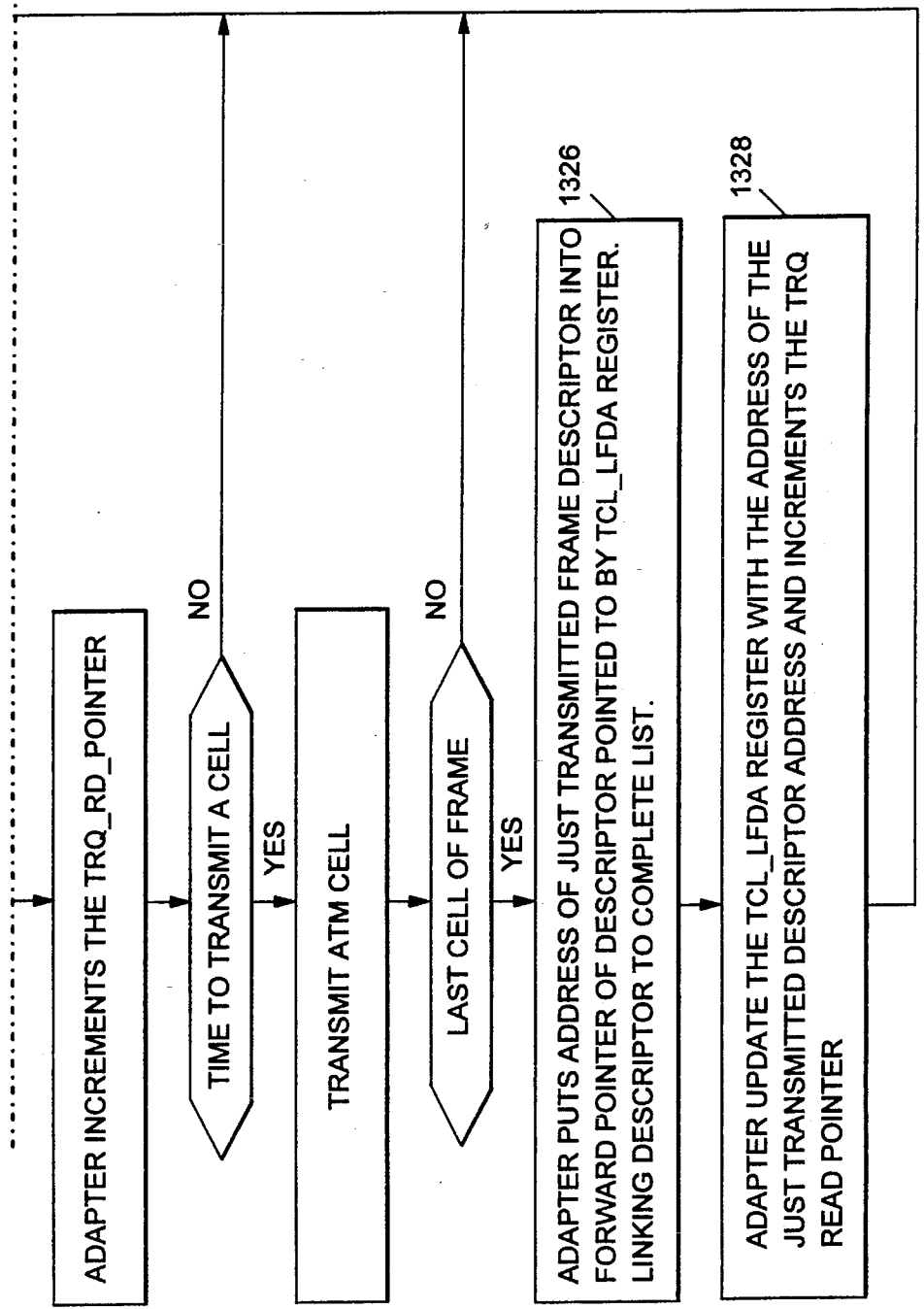

SYSTEM AND METHOD FOR AN EFFICIENT ATM ADAPTER/DEVICE DRIVER INTERFACE

RELATED APPLICATIONS

ISM docket RA9-95-051 entitled "A System And Method For Multi-Frame Received Queuing With Sorting In An Asynchronous Transfer Mode System", Ser. No. 08/513,706, filed Aug. 11, 1995, discloses an adapter/device driver interface for an ATM system that optimizes communications between the device driver and the adapter for improved system throughput. The related application and the present invention are commonly owned by the assignee of the present invention.

BACKGROUND OF THE INVENTION

1. Field of the Invention

This invention relates to an ATM communication system. More particularly, the invention relates to a system and method for an efficient adapter/device driver interface in an ATM system.

2. Description of the Prior Art

Asynchronous transmission mode (ATM) systems are unique in that they can transmit many frames simultaneously by dividing each frame into 48 bytes segments, appending a 5 byte header to each segment, and transmitting the resulting 53 byte cell multiplexed with cells from other frames which are queued for transmission. When cells are received, they are reassembled into frames by stripping the 5 byte cell header and concatenating the remaining 48 bytes with previously received cells for that frame. Different frames may be in various stages of segmentation and reassembly at any given time.

Typically in an ATM system, whenever you want to transmit frames, a device driver has to set up transmit commands to an adapter which transmits the frames and produces an interrupt back to the device driver indicating that the transmit operation is complete. The same general process occurs in the receive direction, that is the device driver issues commands and the adapter, after receiving the data, interrupts the device driver indicating the receive operation is complete. As the data rate increases on the ATM network, the frequency at which the device driver issues the commands and processes the interrupts increases to the point that the device driver can no longer keep up with the data rate. Also, the slowing of the device driver with respect to the data rate increases storage requirements in the adapter and system memory. A system and method which reduces the activity of the device driver in transmitting and receiving data will enhance the performance of ATM systems. More specifically, a system and method which simultaneously segments frames into cells and reassembles cells into frames independent of a system or a device driver across an adapter/driver interface will improve performance and lower storage requirements for the ATM system.

In the related prior art, U.S. Pat. No. 5,297,139 issued Mar. 22, 1994, discloses a method of controlling writing of data from a communication transmission line into a buffer device and reading of the data out of the buffer device. The data is read out of a buffer at a predetermined read rate and the quantity of data written in said buffer is compared with a predetermined threshold. The data from the transmission line is written into the buffer device when it is found that the quantity of accumulated data is the same as or less than the threshold, the buffer performs only write of data from the transmission line. The buffer performs both write of data from the communication transmission line and reading of data out of the buffer device when the quantity of the accumulate data is larger than the threshold.

U.S. Pat. No. 5,274,768 issued Dec. 28, 1993, discloses an interface for coupling a computer to a telecommunication network. The interface includes reassembler for receiving and reassembling frames segmented into a plurality of ATM's cells, each of which comprises a virtual channel identifier and a cell body. The reassembler further includes means for separating each cell body from the associated virtual channel identifier and determining respective link list reference addresses for the virtual channel identifier. A reassembly buffer stores the cell bodies; and a link list manager stores link list data indicative of addresses in which the cell bodies are stored in the reassembly buffer means.

U.S. Pat. No. 5,136,584 issued Aug. 4, 1992 discloses an interface to a multiplexed high speed digital communication network. The interface includes an input port for receiving data (illustratively ATM cells), an output port for transmitting processed received data and a data delay arrangement (illustratively a delay pipeline) that interconnects the input port with the output port and delays propagation of received data in order to provide time for processing the data. The interface uses no internal data storage but makes use of the delay pipeline to move data through the interface as rapidly as possible. A data assembler and state memory assemble data frames out of the received multiplexed, interleaved ATM cells.

None of the prior art addresses the problem of an ATM adapter/device driver interface in segmenting multiple frames from different data sources into cells for transmission and reassembling cells into multiple frames for reception to an application, the transmission and reassembling essentially independent of the device driver. As a result, the device driver is able to keep up with network data rates which improves the performance of ATM system in handling high speed data rates and reduces storage usage at the interface. Nor does the prior art disclose the use of frame descriptors and lists for locating frames in system memory without the use of partitions. Nor does the prior art disclose the use of pointers for linking frames together in transmit ready queues and receive ready lists.

SUMMARY OF THE INVENTION

An object of the invention is an improved ATM communication system in which an adapter simultaneously receives cells from different data sources and transmits multiple frames while minimizing the interaction between the adapter and a device driver in the ATM system.

Another object is a system and method for efficient interaction between an adapter and device driver in an ATM system in processing information at the frame level.

Another object is an ATM system adapter/device driver interface having improved adapter throughput.

Another object is a system and method of re-assembling cells into frames in an ATM system memory using a receive free buffer list and a receive ready list for storage of data cells as frames.

Another object is a system and method for simultaneously segmenting frames into cells and reassembling cells into frames at an adapter/device driver interface in an ATM system whereby the segmenting and reassembling processes are essentially independent of the device driver.

Another object is an adapter/device driver interface in an ATM system using descriptors and pointers to link frames together in a system memory.

Another object is an adapter/device driver interface in an ATM system using lists of buffer to receive data cells into frames and lists of frames for transmission to the system.

These and other objects, features and advantages are accomplished in an ATM communications network including a system processor having a device driver and a memory. The system processor is coupled to an adapter at an interface. The adapter includes a processor and memory. The device driver and adapter cooperate in simultaneously transmitting frames to and receiving frames from the network. In a transmit operation, the device driver identifies frames for transmission to the network using a transmit ready queue residing in the adapter and defined by transmit control registers. A transmit frame complete list is established in the system memory using the transmit control registers. The frames are queued for transmission by the adapter according to the transmit ready queue established by the device driver. An interrupt is generated by the adapter indicating to the system processor that frame transmission is complete. In a receive operation, a receive free buffer list is established by the device driver in system memory. The device driver maintains a pointer to the last entry of the receive free buffer list. The adapter maintains a pointer to the next buffer to be used from the receive free buffer list. A receive ready list is established by the device driver in system memory, with the location indicated to the adapter via the receive control registers in the adapter. The receive data cells are reassembled into frames, in buffers from the free buffer list, in the system memory. At the completion of the reception of a frame, the frame is added to the appropriate receive ready list. An interrupt is generated to the processor by the adapter when one or more completed frames reside on the receive ready list for the device driver to begin a transmit operation.

DESCRIPTION OF THE DRAWINGS

The invention will be more fully apprehended from the following detailed description taken in conjunction with the following drawings, in which:

FIG. 1 is a block diagram of an ATM system including a system processor, a system memory, an adapter and a system/adapter interface which incorporates the principles of the present invention.

FIG. 2 is a block diagram of the system memory and information stored in the memory. FIG. 2 is divided into FIGS. 2A and 2B for convenience.

FIG. 7 is a representation of a transmit complete link list of frame descriptors in the system memory of FIG. 1 after transmission of frames to the ATM network.

FIG. 12 is divided into FIGS. 12A and 12B for convenience.

FIG. 13 is divided into FIGS. 13A and 13B for convenience.

DESCRIPTION OF THE PREFERRED EMBODIMENTS

Figure 3:
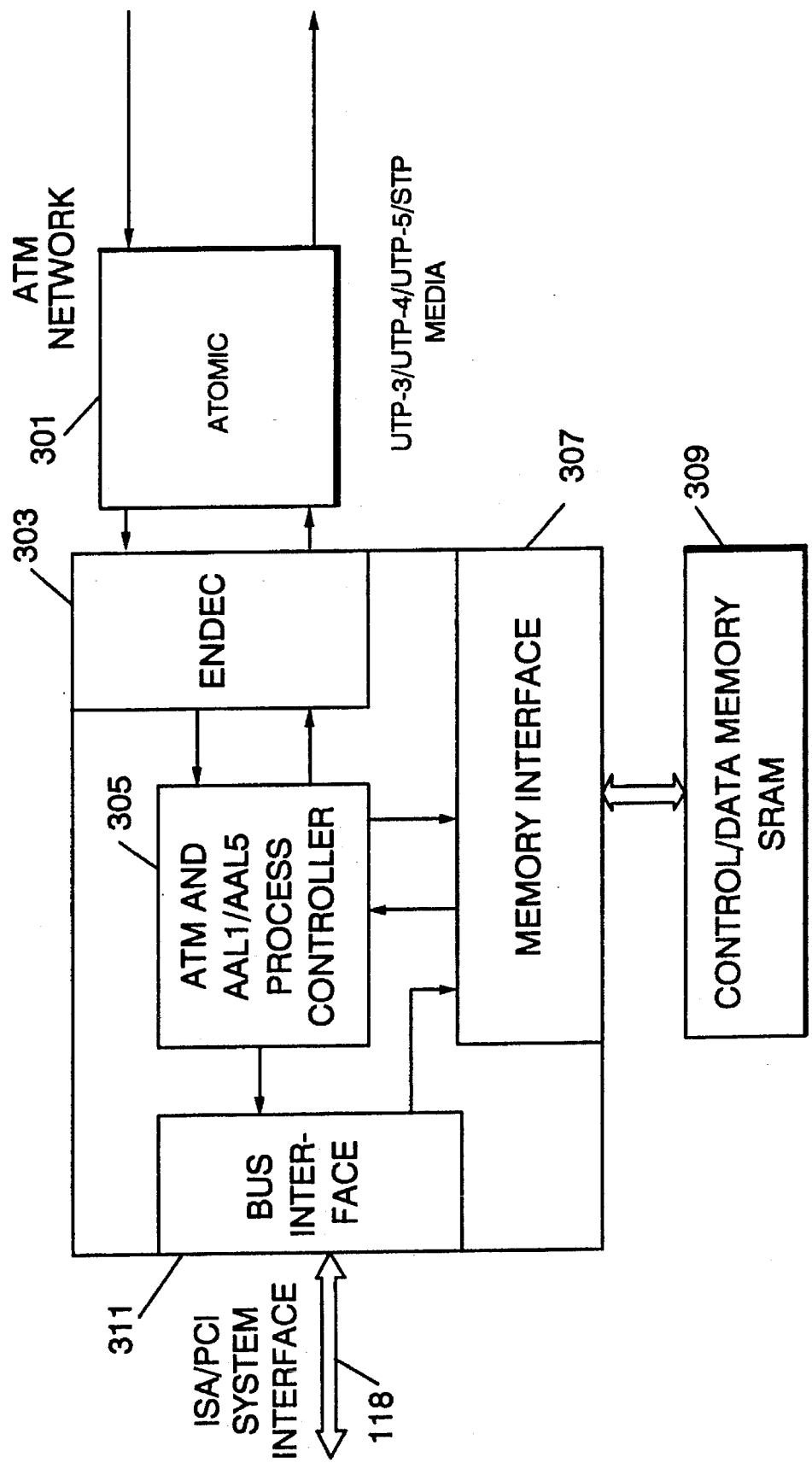
FIG. 3 is a block diagram of the adapter in FIG. 1

In FIG. 1 a personal computer or workstation 110 containing a processor 112, bridge 114, and system memory 116 is coupled through an Industry Standard Architecture (ISA) or Peripheral Component Interconnect (PCI) bus 118 to an adapter 120, which in turn is coupled to an ATM network 122. The processor 112 includes various stored programs such as an operating system 124, applications programs 126, and a device driver 128. The operating system 124 controls the processor in executing the stored application programs 126 which receive data from the network 122 according to the functions of the application programs. The device driver 128 controls the flow of cells and frames between the network 122 and the system memory 116 by way of the adapter 120. The bridge 114 is a buffer for matching the speed of the processor to the System Memory 116 and adapter 120. A primary objective of the invention is to segment frames into cells and reassemble cells into frames substantially independent of the device driver until a frame has been transferred to the network or received into the system memory. In so doing, the device driver will be more efficient in the transmission/reception of data to/from the ATM network 122.

In FIG. 2, the format of information stored in the system memory 116 is shown in more detail. A detailed description of the information stored in the system memory 116 is described hereinafter. In FIG. 2B, a list of receive buffer descriptors 200 are stored in the System Memory 116. Each receive buffer descriptor 200 defines a receive data buffer 202 in the System Memory 116. A receive buffer descriptor 200 includes a data buffer address field 204, a forward pointer address field 206, a data buffer length field 208, a status field 210, and other ATM specific fields. The receive data buffer address 204 in the receive buffer descriptor 200 points to the receive data buffer 202 which is located in the System Memory 116. A receive free buffer list 212 is a linked list of receive buffer descriptors 200 that point to receive data buffers that are available for data storage. The receive buffer descriptors 200 in this receive free buffer list 212 are linked using the forward pointer address field 206. A receive ready list 214 is a linked list of receive buffer descriptors 200 that have been filled with receive frame data. They are also linked using the forward pointer address field 206.

Also stored in the system memory is a list of transmit frame descriptors 250, shown in FIG. 2A. Each transmit frame descriptor 250 defines one or more transmit data buffers 252 in the System Memory 116. A transmit frame descriptor 250 includes a forward pointer address field 254, a transmit complete list (TCL) forward pointer 256, several ATM specific fields, a data buffer count field 258, and a transmit data buffer address field 260 for each associated transmit data buffer, and a transmit data buffer length field 262 for each associated transmit data buffer. The forward pointer address field 206 is used to chain transmit frames for a particular logical channel. The TCL forward pointer 256 is used to chain transmit frame descriptors that have been transmitted to a transmit complete list 264. The transmit data buffer count 258 is used to indicate the number of transmit data buffers associated with a transmit frame descriptor 250. Each transmit data buffer address 260 points to one of the transmit data buffers 252 which is located in the System Memory 116. Each transmit data buffer length 262 indicates the number of bytes in the associated transmit data buffer 252.

In FIG. 3, the adapter 120 is shown in more detail. The adapter 120 is coupled to the network 122 through a bidirectional interface 301 for receiving cells as an input and transmitting cells as an output. Receive cells pass through the ATOMIC network interface module 301, an Encoder/Decoder (ENDEC) 303, a Memory Interface 307, to a Control/Data Memory 309, where the received cells are temporarily stored. A processor 305 is notified when cells are placed in the control/data memory 309. The ATM and AAL1/AAL5 process controller 305 then initiates a move of the cell from the control/data memory 309, through the memory interface 307, the bus interface 311 to the system memory 116 (see FIG. 1). To transmit cells, the ATM and AAL1/AAL5 process controller 305 initiates the move of a cell from the system memory 116 through the bus interface 311, the memory interface 307, to the control/data memory 309, where it is temporarily stored. After which, the transmit cell is moved from the control/data memory 309, through the memory interface 307, the Encoder/Decoder (ENDEC) 303, the ATOMIC network interface module 301 to the ATM network 122.

Figure 4:
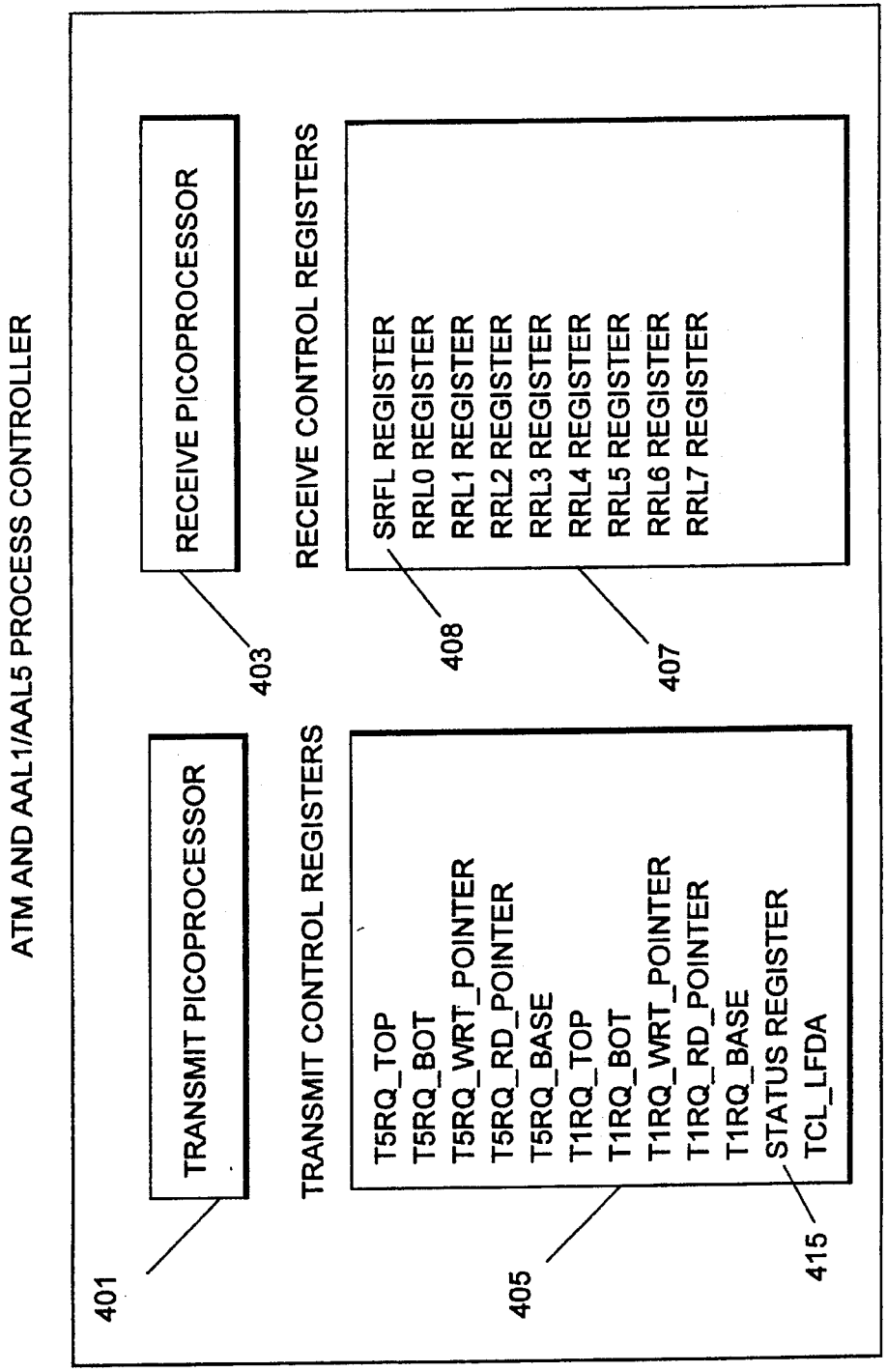
FIG. 4 is a listing of hardware components of an ATM and AAL1/AAL5 process controller in the adapter of FIG. 1.

In FIG. 4, certain details of the ATM and AAL1/AAL5 process controller 305 are shown. The controller 305 includes a picoprocessor 401 for transmit operations and a picoprocessor 403 for receive operations. Also, included in the controller 305 are transmit control registers 405 and receive control registers 407. The transmit and receive control registers are set by the device driver to identify frames to be transmitted to the network and the receive ready lists to store reassembled cells from the network into frames. A transmit ready queue (TRQ) (see FIG. 5) is established in the control/data memory 309 by the device driver 128 to queue transmit operations to be performed by the adapter hardware in transferring frames from the system memory 116 to the ATM network 122 through the adapter 120. The size of the TRQ and the location within the control/data memory 309 is determined at initialization by parameters written by the device driver into transmit control registers 405. There are two transmit ready queues (T5RQ and T1RQ), one for AAL5 traffic and a second for AAL1 traffic. Both queues have the same construction and are both located in the control/data memory 309. Each TRQ has five registers which define the location in control/data memory 309. The five registers define the base (offset into control/data memory 309), top, bottom, write pointer, and read pointer associated with the queue. The device driver locates the TRQ in the control/data memory 309 by writing the base register, top register and the bottom register. The contents for the four bit base register concatenated with the contents of the 13 bit top register determines the beginning of the queue. The contents of the four bit base register concatenated with the contents of the 13 bit bottom register, determine the end of the queue. At initialization both the read and write pointers point to the top of the queue indicating the queue is empty.

Returning to FIGS. 1 and 2, the processing of frames received from the ATM network 122 will be described. Device driver 128 and adapter 120 communication is facilitated by a receive free list 212 and a receive ready list (RRL) contained in the system memory 116. As ATM cells are reassembled into frames in the system memory 116, data buffer descriptors, and their associated buffers, are taken from the free buffer list and are used to store the received cells on an, as needed basis. As the buffers are used the buffer descriptors are chained together to form a linked list of buffer descriptors which point to buffers containing the complete frame. Once the frame is completely reassembled in the system memory 116, a pointer to the first buffer descriptor of the frame is placed on one of receive ready list 214 located in the system memory 116. The processor 112 is interrupted to service the receive ready list. Interface efficiency is improved using these data structures which allow the device driver to process multiple frames with a single interrupt.

Figure 5:
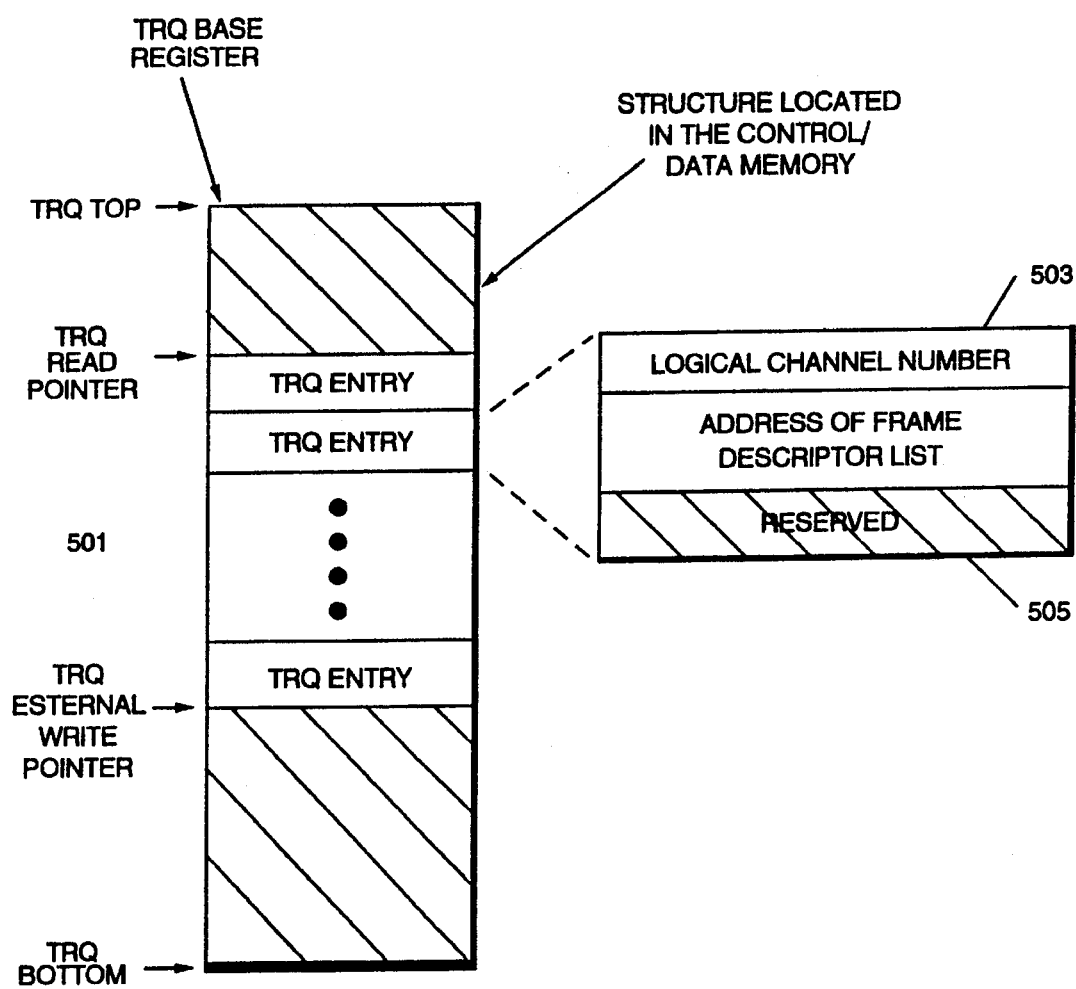
FIG. 5 is a representation of a transmit ready queue (TRQ) established in a control/data memory in the adapter of FIG. 1.

Turning to FIG. 5, which depicts step 1 of the transmit process, shows the format of a TRQ queue entry 501 in the control/data memory 309 and is defined by the transmit control registers 405 (See FIG. 4). The first 16 bit word 503 contains the logical channel number (LC) for which the transmit operation is associated. The next two words contain the address 505 of the frame descriptor in the system memory 116. The TRQ 501 is written into by the device driver each time an ATM frame or frames is to be transmitted for a particular LC. There are two transmit ready queues, one for AAL1 traffic and one for AAL5 traffic (T1RQ and T5RQ).

To prevent the device driver code from overfilling a TRQ, a status register included in the transmit control registers 405 containing a "full" bit for each of the queues must be polled. If the status bit indicates that the associated queue is not full, the device driver is free to add the next entry. However, if the status register indicates that the queue is full, the device driver must continue to poll the status until a 'not full' indication is received.

The TRQ allows the device driver to queue multiple frames for transmission asynchronously while the adapter hardware processes existing frames. This improves the performance of the adapter and the device driver.

Figure 6:
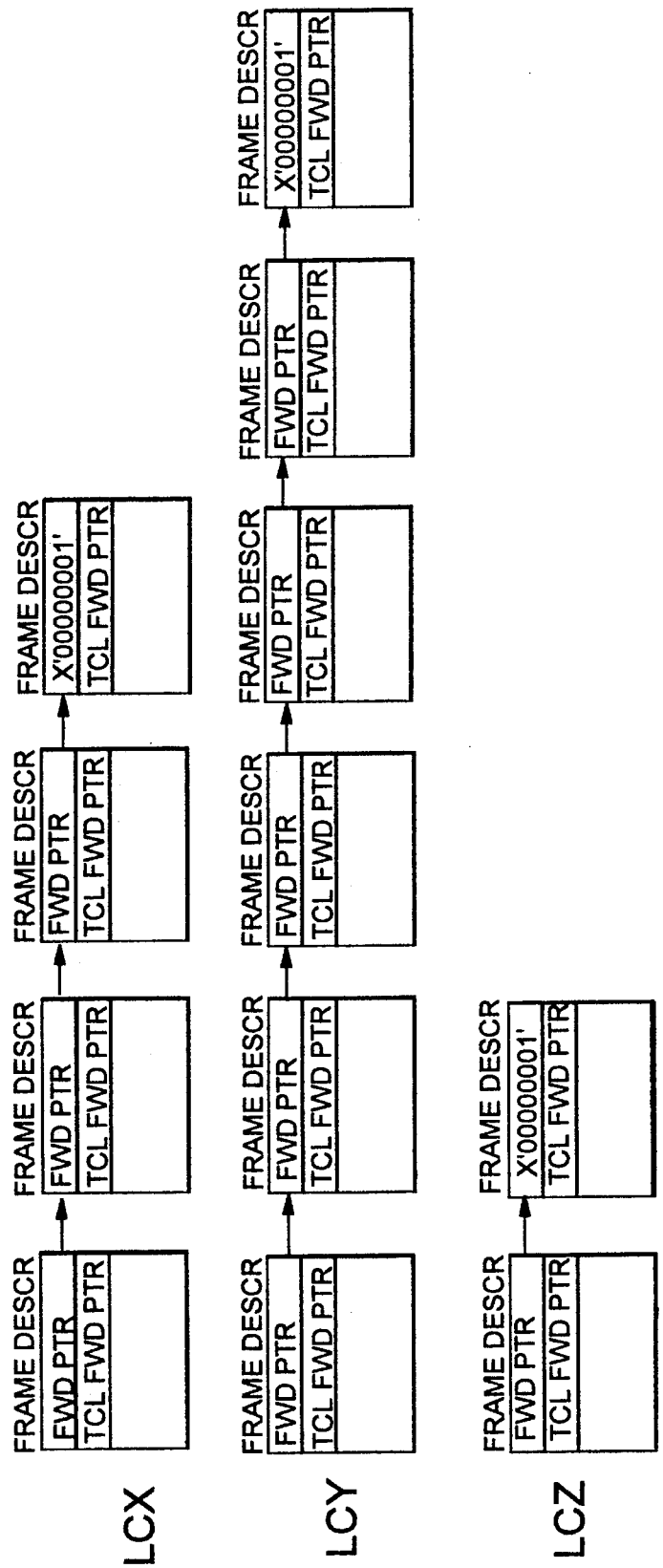
FIG. 6 is a representation of transmit frame descriptors linked together in the system memory of FIG. 1 before transmission to the ATM network.

In FIG. 6, the second step of the transmit process is depicted. In this step, the adapter 120 removes entries on the TRQ and links them, based on their TRQ LC number 503 into lists of frames to be transmitted. The end of the linked list is indicated with a forward pointer equal to x'00000001'. There will be one list for each ATM logical channel with outstanding transmit requests. In FIG. 6 there are three LCs shown LCx, LCy, and LCz. Frames associated with the first descriptor of each list are transmitted simultaneously by interleaving one cell from each frame. As frame transmission is completed for an LC, the descriptor for that frame is removed from the list. If the just removed descriptor is not the last, transmission of the frame associated with next linked descriptor is started. This process continues until frames associated with all linked descriptors have been transmitted. When the device driver puts an entry on the TRQ for an LC that does have an outstanding transmit request, a new linked list for that LC is generated. The just linked frame will be transmitted by interleaving cells with cells from frames already being transmitted. If the device driver places a transmit request on the TRQ for an LC currently transmitting, that request is linked to the list associated with the LC and will be transmitted as described above.

In FIG. 7, the third step of the transmit process is depicted. In this figure, descriptors are shown linked to form a transmit complete list for logical channels LC X, LC Y and LC Z. The system must keep the address of the last transmit frame descriptor processed. The adapter 120 updates the TCL forward pointer of the last frame transmitted with the newly transmitted frame descriptor address. The frames are transmitted in the order of LC X, LC Y, LC X, and LC Z. The frame descriptors are located in the system memory 116 and the TCL is built by the adapter 120 in the system memory 116 as frames are transmitted. At initialization, the TCL__ last frame data address (LFDA) register, located in the transmit control registers 405 (See FIG. 4), is written by the device driver with the address in the system memory 116 of the last serviced frame descriptor. This descriptor is a dummy address used to "prime the pump". As the adapter completes the transmission of frames, the newly completed frame descriptor is linked to the transmit complete list using the transmit complete list forward pointer field located in the frame descriptor. The end of the linked list is indicated by writing a forward pointer with the least significant bit set to a b'1'. As the adapter adds to the transmit complete list, the contents of TCL__LFDA are updated with the system memory address of the last entry added. The device driver maintains a pointer of the entry last processed. The adapter will set the TCL forward pointer for the last frame descriptor of the newly linked frame equal to '00000001'X to indicate the end of the TCL. The system will know when the end of the TCL has been reached when the forward pointer equals '00000001'X. The advantage of this process is that the TCL is formed by linking the descriptors together. Using this approach it is impossible to overrun the transmit complete list. This process also provides an asynchronous interface between the adapter hardware and the device driver software. Multiple frames can complete transmission and be queued before requiring device driver service.

Figure 8:
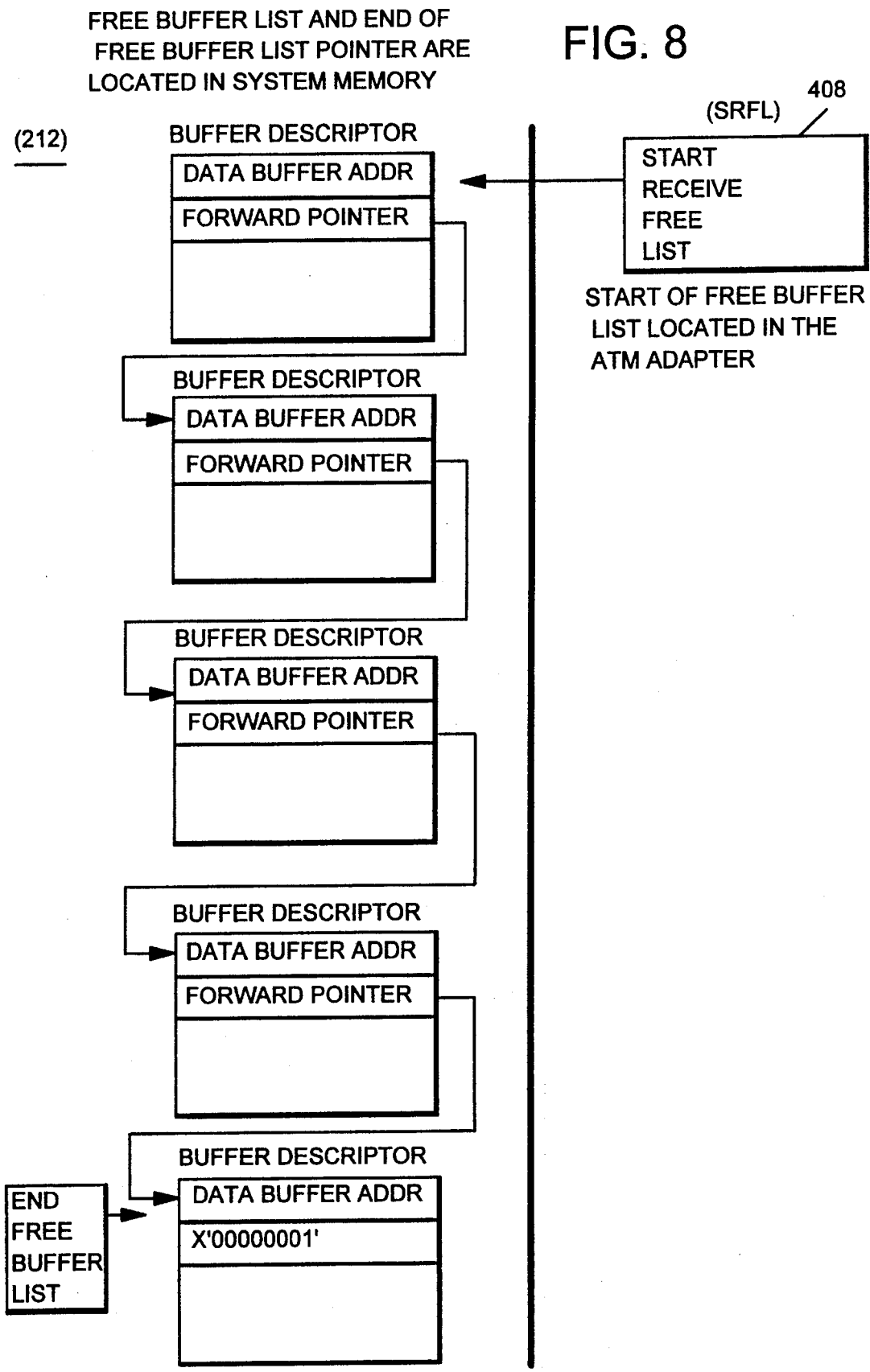
FIG. 8 is a representation of a receive free buffer list containing free buffer descriptors in the system memory which are used by the adapter to store received frames.

Turning to FIG. 8, there are two entities associated with the process of receiving cells from the ATM network 122. These entities are the free buffer list 212 and the receive ready list 214 in the system memory 116 of FIG. 2. The free buffer list is maintained by both the device driver and the ATM and AAL1/AAL5 process controller 305. The device driver role is to build a linked list of free buffer descriptors at initialization using the forward pointer located in a buffer descriptor and to maintain a pointer to the last entry on the list. This pointer is used when adding additional buffers to the list or returning buffers to the list after processing receive frames. As buffers are returned or added, the device driver must update the pointer to always point to the last entry.

The role of the ATM and AAL1/AAL5 process controller 305 (See FIG. 3) in maintaining the free buffer list is to keep a copy of the address of the beginning of the list. This address is located in the start of free buffer list (SRFL) register 408 in the receive control registers 407 (See FIG. 4) which is initialized by the device driver. As the data is written to the system memory 116, the adapter 120 removes buffers from the free list and updates the SRFL register by copying the forward pointer from the buffer descriptor into the SRFL. Hence, the SRFL always contains the address of the next entry on the free buffer list.

To prevent depleting the free buffer list, the forward pointer of the last entry on the list has bit 0 set to a b'1'. The adapter 120 checks for this value and when found generates an interrupt to the processor 112 indicating that the free list is exhausted. The last buffer on the list is never used to store received data but is kept on the free buffer list to provide a chaining point for additional buffers as they are returned or added. The free buffer list is shared between the device driver 128 and the adapter 120, with the device driver 128 tracking the tail of the list and the adapter 120 tracking the head of the list.

If the free buffer list becomes exhausted, it is necessary for the device driver to know where the "end of the list" is located in the system memory 116. To obtain this information, it is necessary for the device driver to read the SRFL register. The free buffer list provides necessary means to transfer frames between the adapter and the system memory with intervention of the device driver only on a per frame basis.

Figure 9:
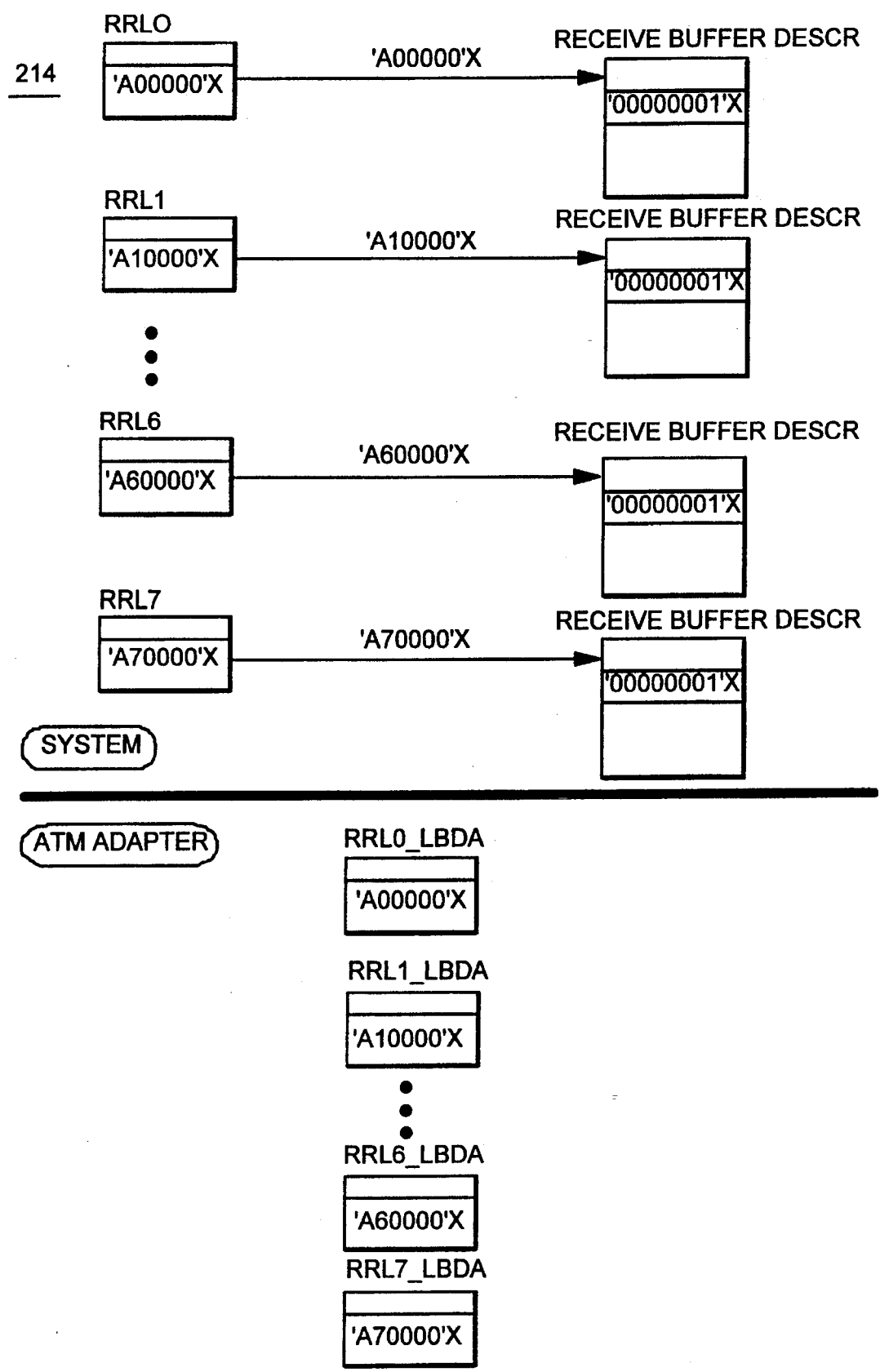
FIG. 9 is a representation of initialization of receive ready list pointers in the system memory and the adapter of FIG. 1.

Turning to FIG. 9, the second entity used in the receive process is the receive ready lists 214 (See FIG. 2). The receive ready lists are established by the device driver 128 and are located in the system memory 116. As cells are received from the ATM network 122 and placed in the buffers taken from the free buffer list, the associated buffer descriptors are linked together until a complete frame is assembled in the system memory 116. Once a frame is assembled, the buffer descriptors associated with the frame are linked onto one of the eight receive ready lists RRL0–RRL7 shown in FIG. 9. The fact that the frame has been reassembled in the system memory 116 is conveyed to the device driver using a system interrupt status register 1015 (see FIG. 10) located in the ATM and AAL1/AAL5 process controller 305. The system interrupt status register 1015 contains a status bit for each of the eight received ready lists RRL0–RRL7 maintained by the device driver in the adapter by the ATM and AAL1/AAL5 process controller 305. By having multiple receive ready lists, the device driver can assign priorities to the LCs.

Once the device driver reads the system interrupt status register 415 and discovers that frames have been received from the ATM network 122 and placed on one of the receive ready lists, the device driver propagates through the receive ready list and processes all frames until it reaches the end of that RRL. The end of the RRL is reached when the forward pointer address field, bit 0, in the buffer descriptor is equal to b'1'. (Valid addresses are located on a 4 byte boundary.) When the end of RRL is reached, the device driver will retain the address of the last received buffer descriptor processed for the receive ready list in the system memory 116.

The device driver 128 updates the receive free list (RFL) as buffers in the system memory 116 are released. The driver also updates the forward pointer of the descriptor which is currently at the end of the receive free list to point to the first of a list of descriptors being added (descriptors may be added to the RFL one at a time or several at a time). The last added descriptor in the list must have a forward pointer indicating end of list (that is, a forward pointer with bit 0 set b'1'.)

The device driver must manage and update a pointer to the first entry on each of the receive ready lists. This pointer is located in the system memory 116. The pointer indicates the last buffer descriptor address (LBDA) processed as a result of a previous interrupt. This value also tells the device driver which descriptor to start processing when the next interrupt is received for the associated RRL. The device driver will continue to process entries on the RRL until a descriptor with a forward pointer with bit 0 set to a b'1' is reached. At this point processing of descriptors stops until the next interrupt with status indicating RRL service is required is received.

An example of the system initialization process of the Receive Ready List pointers is shown in FIG. 9. The pointers, located in system memory, to the eight received buffer lists (RRL 0–7) are initialized with the address of a buffer descriptor. The forward pointer located in these buffer descriptors is set to '00000001'x. In the adapter 120, the registers RRL0–RRL7, in the receive control registers 407, are also initialized with these same address values by the device driver.

The ATM and AAL1/AAL5 process controller 305 uses one of the eight received ready lists located in the system memory 116 to notify the device driver that a complete frame has been reassembled. These lists consist of a linked list of receive buffer descriptors whose associated buffers contain the received frame. The first descriptor of the chain associated with the received frame contains the status and length of the frame. Each descriptor in the list points to the next descriptor until a pointer with bit 0 set to a b'1' is reached marking the end of a chain. (See FIG. 10). Multiple receive frames can be linked together waiting to be processed by the device driver. The eight received ready list in the system memory 116 form eight status queues which contain the status of the received frames. The processing of these eight lists can be prioritized by the device driver.

The pointer to the last processed entry of each of the eight receive ready lists is kept by the device driver. The received ready lists registers maintained by the ATM and AAL1/AAL5 process controller 305 contain the address of the last entry added to each list by the adapter. The device driver will initialize the receive ready lists registers and its own copy with the address of a buffer descriptor. At initialization, these descriptors point to empty buffers which have their forward pointers set 00000001'x. These first eight buffers are not used by the adapter 120 to store data. Their descriptor addresses serve to only "prime the pump" and provide a starting descriptor address that the adapter 120 can use when linking the first received frames descriptors.

To add an entry to one of the receive ready lists, the adapter uses the associated receive ready list register to locate the last entry on the list, changes the forward pointer of that entry to point to the first descriptor of the receive frame, and set the forward pointer of the last descriptor of the chain to '00000001'x. Bit 0 of the forward pointer is set to b'1' which indicates the end of the chain. The intermediate descriptors associated with this frame are linked using their forward pointers as the frame is being reassembled. After the adapter links the received frame descriptors to one of the eight received ready lists, it will set a bit in the system interrupt status register 415 to indicate the need to process received frames and then generate a system interrupt. The receive ready list selection is based on a field contained in the logical channel table, not shown, stored in control/data memory 309.

The device driver is interrupted when a complete frame has been transferred from the adapter 120 to the system memory 116. A complete frame consists of one or more receive buffers. Since multiple receive buffers may exists for a complete frame, the adapter will link the receive buffers for a complete frame using the forward pointer of the buffer descriptors prior to the device driver involvement.

Figure 10:
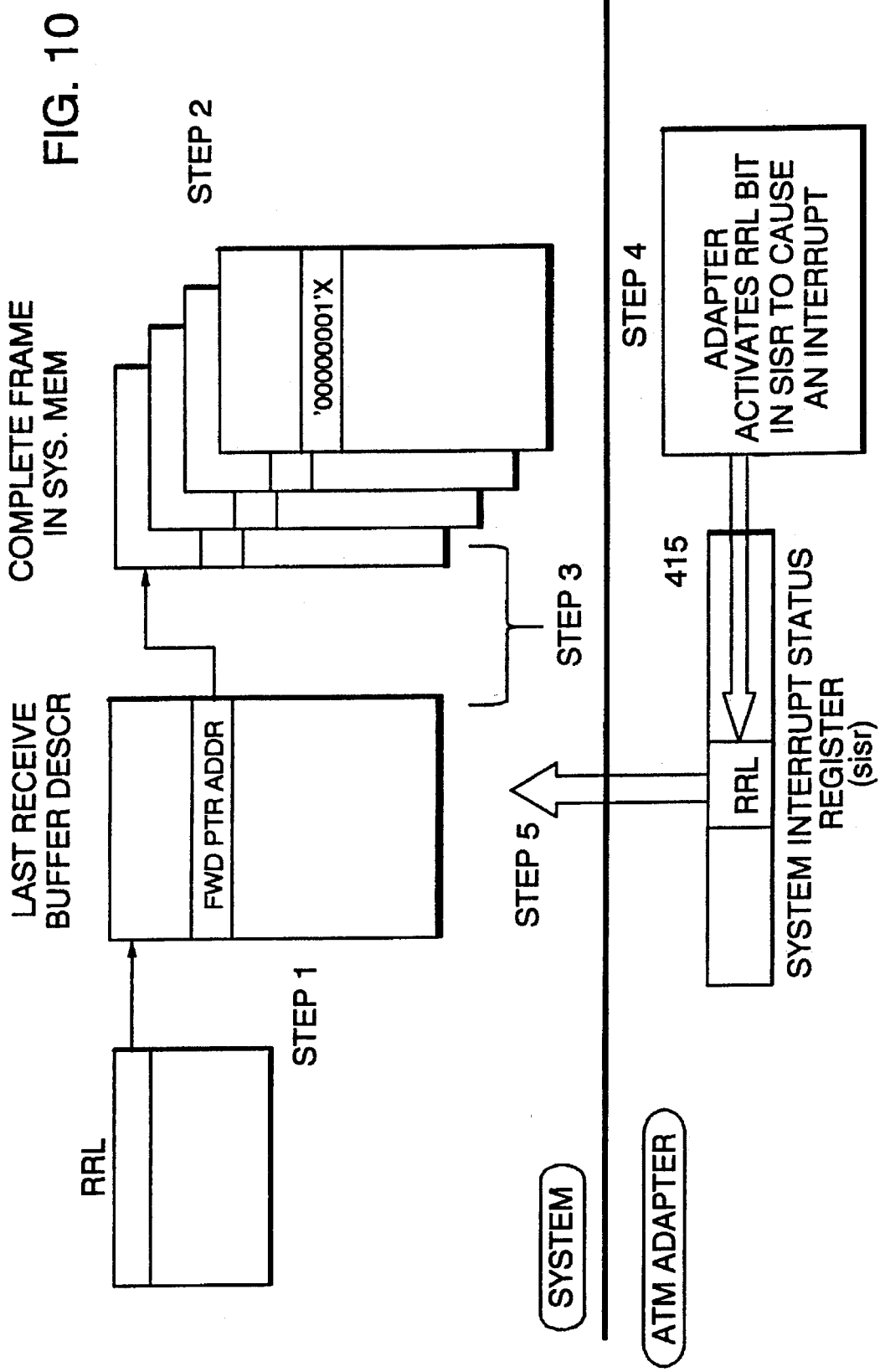
FIGS. 10 and 11 are a representation of processing frames on a receive ready list in the system of FIG. 1.
Figure 11:
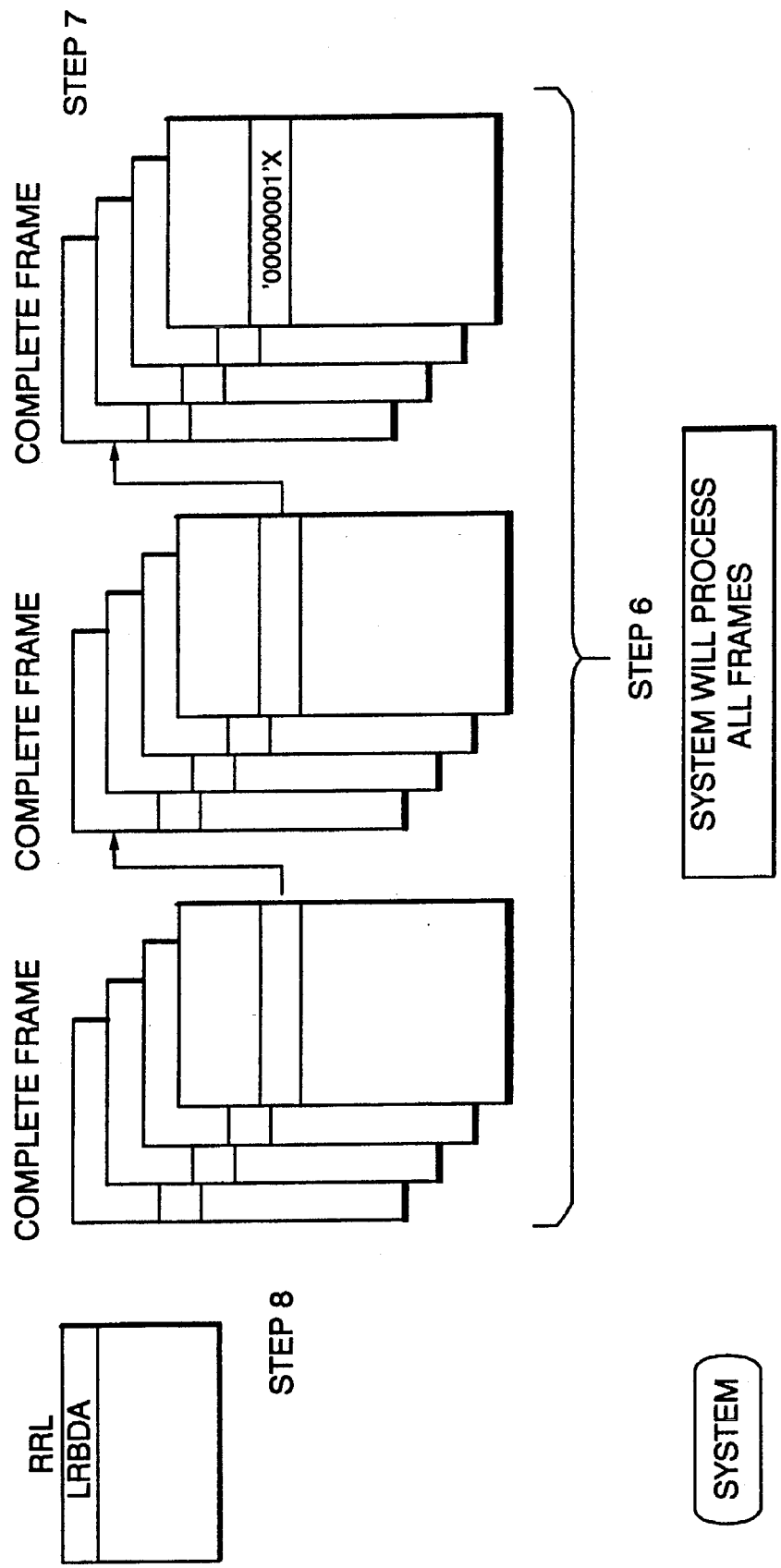

Turning to FIGS. 10 & 11, a representation is shown for the receive process occurring in the system and the adapter for receiving a frame. In a step 1, a frame is stored in buffers located in the system memory 116, each buffer identified by a descriptor indicating length, address, status, and a pointer to the next buffer. When applications frames are complete, the device driver keeps the address of the last transmit frame descriptor processed for the receive ready list. In a step 2, the adapter sets the forward pointer for the last receive buffer descriptor of the newly linked frame equal to '00000001'X to indicate the end of the receive ready list. The device driver knows when the end of the received ready list is complete if the forward pointer='0000001'X. In a step 3, the adapter creates a link with the newly deposited frame by writing the first frame descriptor address for the completed frame into the forward pointer address of the last receive buffer descriptor. In a step 4, the adapter activates a receive ready list bit in the register 415 for a system interrupt. In a step 5, the device driver reads the register 415 when interrupt occurs and finds which receive ready list has a completed frame. In a step 6, the device driver sends all completed frames to a transmit complete buffer (not shown) in the control/data memory 309 in the adapter 120 for transmission to the network. In a step 7, the driver will know when the end of a receive ready list has been reached when the forward pointer bit 0='1'b. In a step 8, the driver retains the address of the last receive buffer descriptor processed for the receive ready list.

Figure 12:
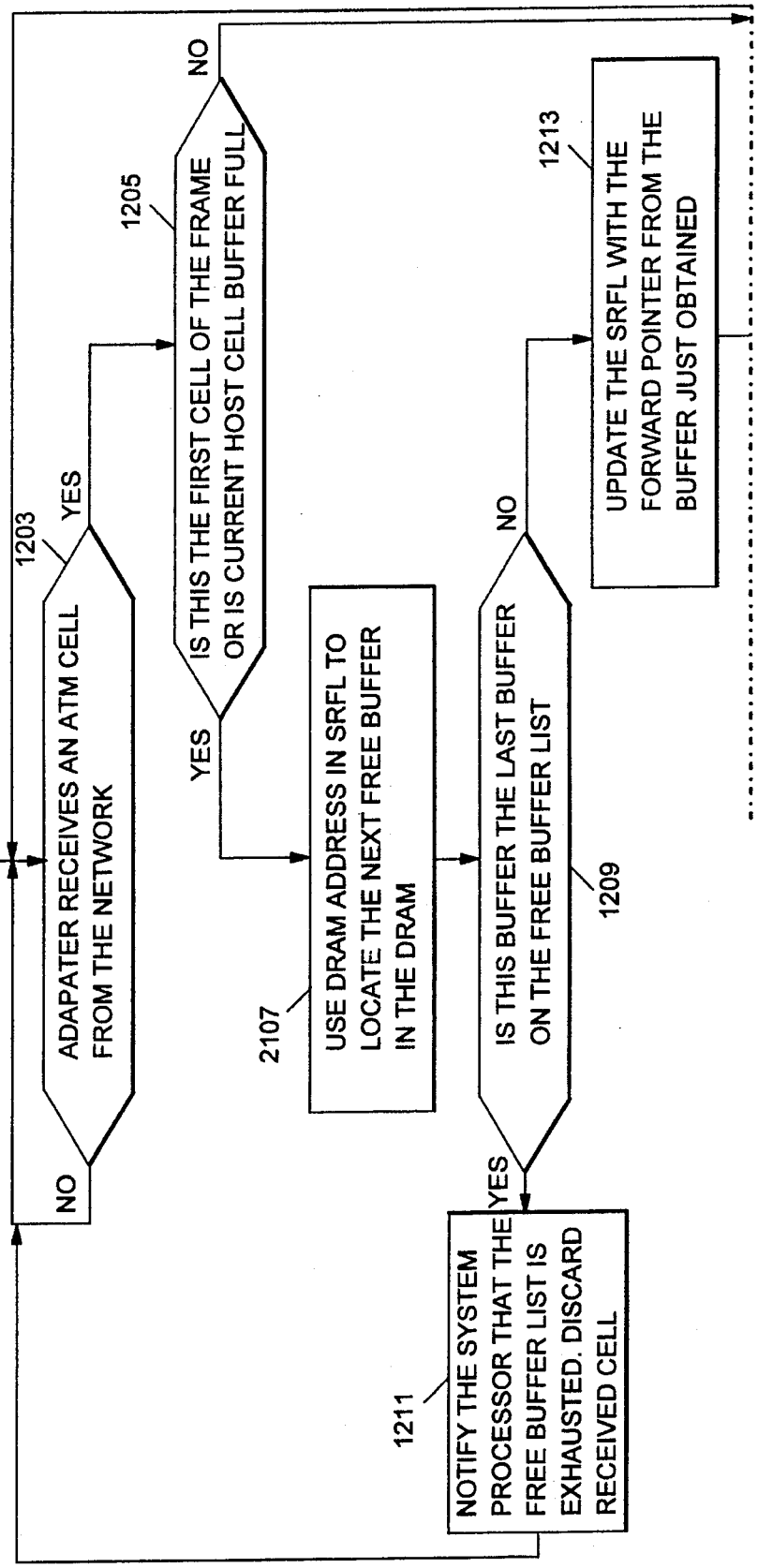
FIG. 12 is a flow diagram of a transmit operation performed by the system of FIG. 1.
Figure 12B:
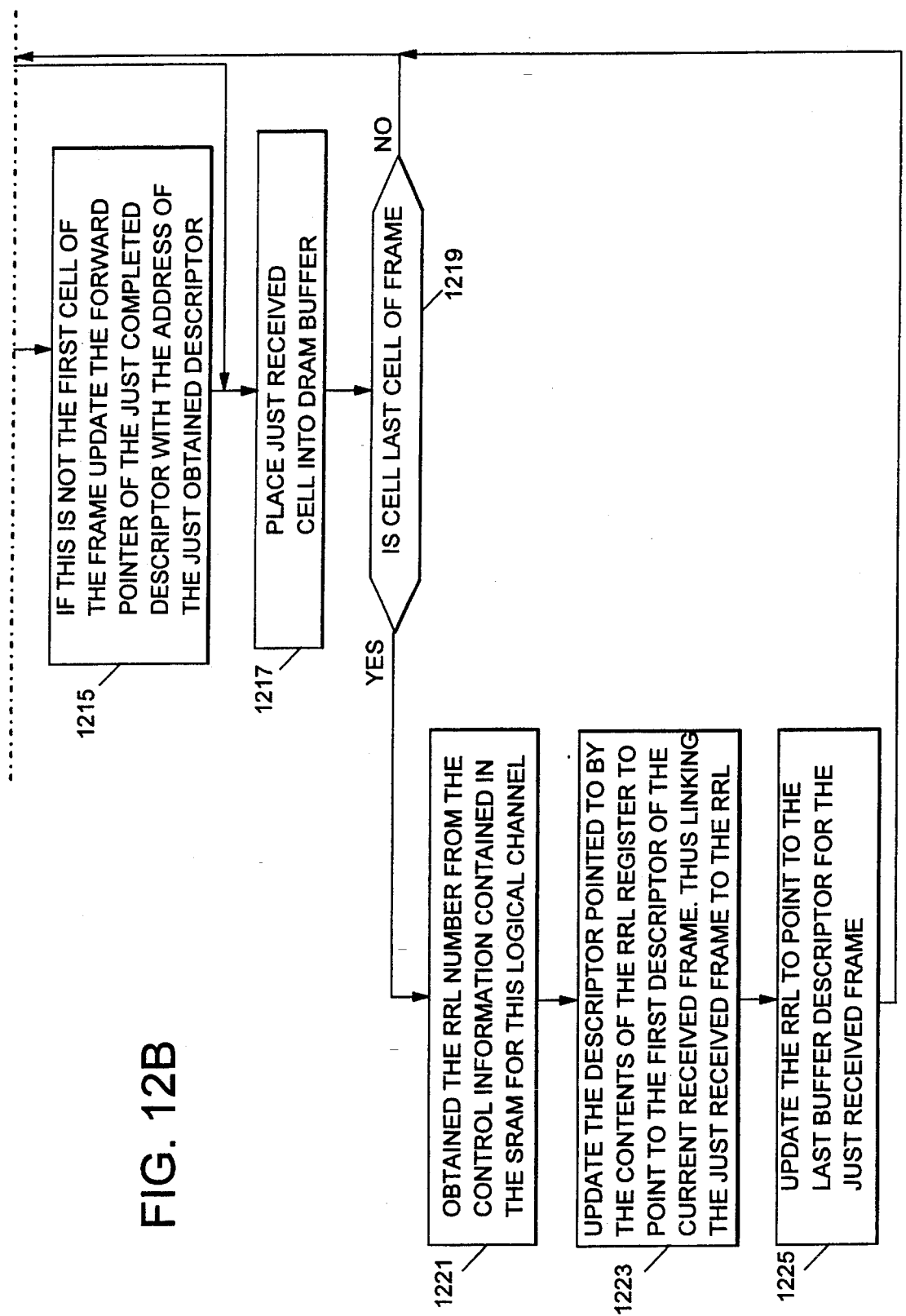

Turning to FIG. 12 the receive process executed in the device driver and the adapter is described in further detail. In a step 1201, occurring at initialization for receiving cells from the network, the system processor builds a linked list of descriptors for free buffers in the system memory. Each buffer descriptor is chained to the next via a forward pointer. The driver maintains a pointer to the end of the list, and writes the address of the first buffer descriptor to the start free list register (SRFL) in the adapter control/data processor 403. When the adapter receives an ATM cell from the network 122 in a step 1203, the adapter determines if the cell is the first of a frame or whether the current system buffer is full in a step 1205. A "no" condition places the cell into a system buffer defined by the first descriptor in the free buffer list 212 (See FIG. 2) preparatory to a step 1217 to be performed hereinafter. A "yes" condition uses the address in the SRFL to locate the address of the next free buffer in the system memory, in a step 1207. In a step 1209, the device driver determines if the buffer is the last on the free buffer list. If a "yes" condition exists, the device driver is notified and the cell is discarded in a step 1211. If a "no" condition exists, the SFRL is updated with the pointer from the just obtained buffer in a step 1213. In a step 1215, the adapter 120 determines if the received cell is the first cell, if not the forward pointer of the just completed descriptor is updated with the system memory address of the just obtained descriptor and the cell is placed into the buffer defined by the descriptor in a step 1217. The process is repeated until the last cell is identified by the adapter in a step 1219. The adapter accesses the control/data memory for the received ready list associated with the logical channel related to the cell in a step 1221. The adapter updates the descriptor pointed to by the contents of the received ready list register to point to the first descriptor of the current received frame thereby linking the just received frame to the received ready list in a step 1223. The received ready list register 407 is updated by the adapter to point to the last buffer descriptor for the just received frame in a step 1225 whereupon the process returns to the step 1203 for processing the next cell received from the network.

Figure 13A:
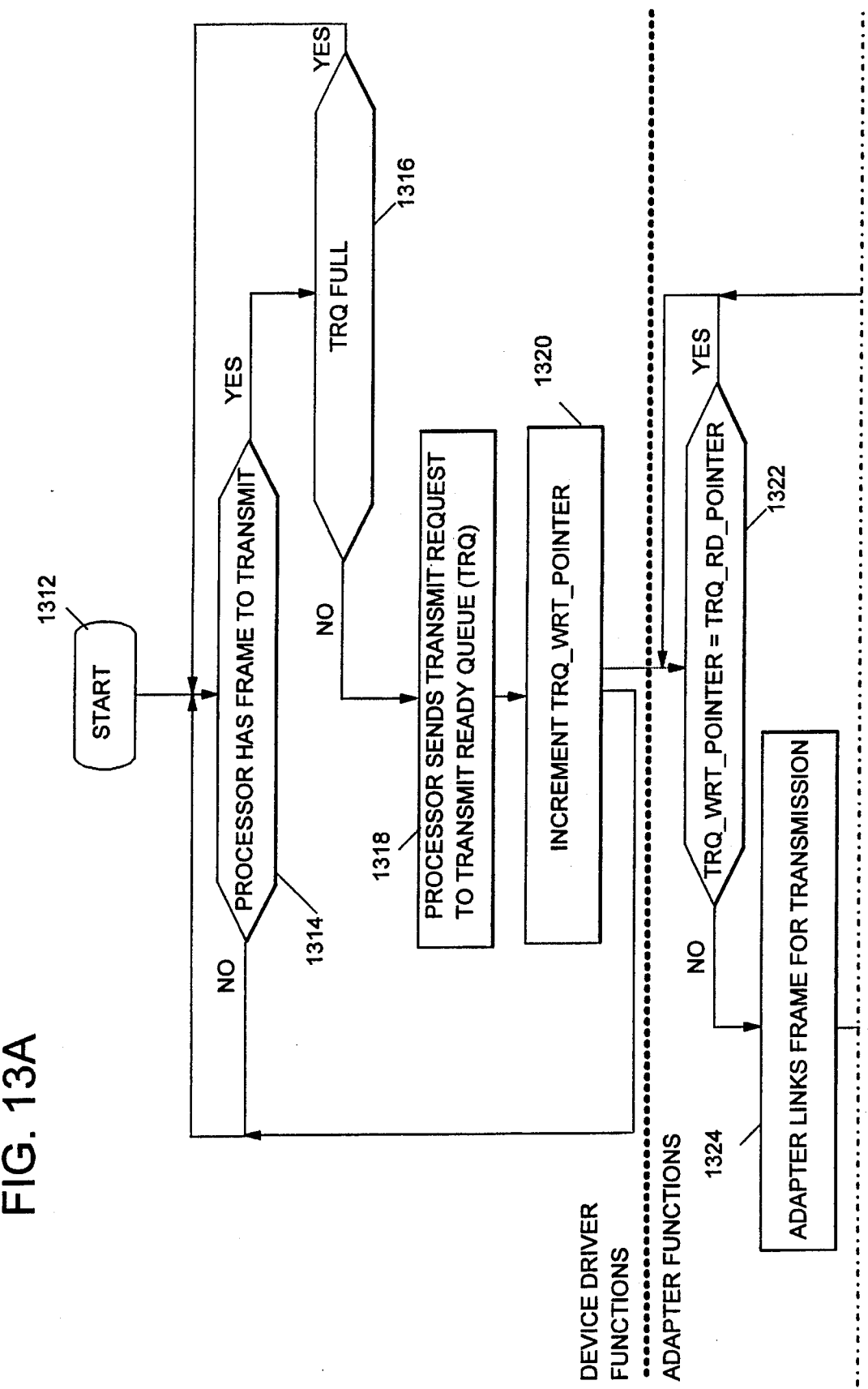
FIG. 13 is a flow diagram of a receive operation performed by the System of FIG. 1.

Turning to FIG. 13 the transmit process is described in the device driver and the adapter for transmitting a frame to the network. At initialization, the device driver in a step 1312 (a) initializes the transmit control registers 405; (b) establishes a transmit ready queue (TRQ) 501 in the Control/Data Memory 309 defined by the TRQ_TOP, TRQ_BOT, TRQ_RD, TRQ_WRT and TRQ_BASE registers; (c) writes the transmit complete last free descriptor address indicating the end of the transmit complete list in the system memory, and (d) sets the TRQ write pointer to equal the TRQ read pointer indicating an empty queue. The driver determines when a frame is ready for transmission in a step 1314. A "no" condition continues the monitoring by the device driver for a frame ready for transmission. For a "yes" condition which indicates a frame is ready to be transmitted, the device driver determines if the TRQ is full in a step 1316. Thereafter, the driver sends a transmit request to the TRQ in a step 1318 and increments the TRQ write pointer in step 1320. The adapter monitors the TRQ in a step 1322 to determine when the transmit write pointer equals the transmit read pointer in the TRQ 405. In a step 1324, the adapter obtains the ready frame from the system memory 116 and transmits the frame to the ATM network 122. In a step 1326, the adapter puts the address of the just transmitted frame descriptor into the forward pointer of the descriptor pointed to by the transmit complete list pointer last free descriptor address (TCL-LFDA) register linking the descriptors to the transmit complete list. In a step 1328, the adapter updates the TCL-LFDA register with the address of the just transmitted descriptor address and increments the transmit ready queue read pointer to initiate the next frame transmission sequence at the step 1322.

In summary, by segmenting frames into cells and reassembling cells into frames substantially independent of a device driver until a frame has been transferred to the network or received into the system, the adapter/device driver will be more efficient on a high speed multiplexed ATM network. Further, using receive ready lists and transmit ready queues, the device driver will be able to process multiple frames with a single interrupt. Frames can be added to a receive ready list while frames are being transmitted by the adapter using the transmit ready queue. System memory is being cleared as frames are transmitted according to the free buffer list which is updated by the adapter. The processing of cells and frames using descriptors eliminates the need for partitions in system memory.

While the present invention has been described with reference to a few specific embodiments, the description is illustrative of the invention and is not to be construed as limiting the invention. Various modifications may be inherent to those skilled in the art without departing from the spirit and scope of the invention.

What is claimed is:

1. In an ATM communications network, a system processor including a device driver, a system memory and an adaptor coupled together at an interface for increased system processing performance and memory utilization, comprising:
   a) adapter processor and control memory means included in the adapter,
   b) means for establishing transmit and receive control registers in the control memory;
   c) means for receiving data cells from the network for storage as frames on received ready lists in system memory;
   d) means for establishing a transmit ready queue (TRQ) in the control memory; the TRQ identifying frames for transmission on a received ready list;
   e) means for establishing in system memory a transmit complete list (TCL); and
   f) means for generating an interrupt to the device driver indicating frame transmission complete and updating the TCL.

2. The communication network of claim 1 further comprising:
   a) means for establishing a receive free buffer list for identifying receive buffers in system memory for storing data cells received from the network;
   b) means for locating the beginning of the receive free buffer lists; and
   c) means for indicating the end of the free buffer lists.

3. The communication network of claim 2 further comprising:
   means for establishing receive ready lists including buffer descriptors for completed frames.

4. The communication network of claim 3 further comprising:
   means for generating an interrupt to the device driver indicating that one or more completed frames resides on the received ready lists.

5. The communication network of claim 4 wherein the transmit ready queue is defined in the control memory by a base register having a top address; bottom address; a write pointer and a read pointer.

6. The communication network of claim 5 wherein the adapter processor includes a transmit sub-processor and receive sub-processor, the transmit sub-processor retrieving data from the system memory for transmission to the network and the receive sub-processor transferring data to the system memory.

7. The communication network of claim 6 further including a start of free buffer list register and a plurality of receive control registers in the control memory.

8. The communication network of claim 7 further including a receive free buffer list and end of free buffer list pointers located in system memory.

9. The communication network of claim 8 wherein system memory includes transmit frame descriptors identifying buffer locations in system memory for frames ready for transmission to the network.

10. The communication network of claim 9 wherein system memory includes receive buffer descriptors for receive buffer location.

11. The communication network of claim 10 further including a logical channel number table in control memory for relating frame addresses and descriptors to TRQ entries.

12. The communication network of claim 9 wherein the transmit ready queue contain entries of frames stored in system memory for transfer to the network.

13. The communication network of claim 10 further including a system interrupt status register in the a control memory which initiates an interrupt to the processor when a receive ready list bit is set in the register.

14. In an ATM communications network, a system processor including a device driver, a system memory and an adaptor coupled together at an interface for increased system processing performance and memory utilization, a method for increasing system processing performance and memory utilization, comprising the steps of:
   a) initializing transmit control registers in the adapter;
   b) establishing a transmit ready queue (TRQ) defined by the transmit control registers;
   (c) writing a transmit complete last free descriptor address indicating the end of a transmit complete list in system memory;
   (d) setting a TRQ write pointer to equal a TRQ read pointer indicating an empty queue in the TRQ;
   e) determining when a frame is ready for transmission in system memory; a "no" condition continuing the monitoring by the system processor for a frame ready for transmission; a "yes" condition indicating a frame ready to be transmitted;

f) determining if the TRQ is full;

g) sending a transmit request to the TRQ;

h) incrementing the TRQ write pointer while the adapter monitors the TRQ to determine when the transmit write pointer equals the transmit read pointer;

i) obtaining a ready frame from the system memory; and j) transmitting the ready frame to the communications network.

15. The method of claim 14 further comprising the steps of:

placing the address of a just transmitted frame descriptor into the forward pointer of the descriptor pointed to by the transmit complete list pointer last free descriptor address (TCL-LFDA) register;

b) linking the descriptors to the transmit complete list;

c) updating a transmit complete list-last free descriptor address register with the address of the just transmitted descriptor address; and d) incrementing the transmit ready queue read pointer to initiate the next frame transmission sequence to the communication network.

16. In an ATM communications network, a system processor including a device driver, a system memory and an adaptor coupled together at an interface for increased system processing performance and memory utilization, a method for increasing system processing performance and memory utilization, comprising the steps of:

a) building a linked list of descriptors for free buffers in system memory, each buffer descriptor chained to the next via a forward pointer;

b) maintaining a pointer to the end of the list in the system processor;

c) writing the address of the first buffer descriptor to start a free list register (SRFL) in the adapter;

d) receiving an ATM cell from the network;

e) determining if the cell is the first of a frame or whether a current system buffer is full; a "no" condition placing the cell into a system buffer; a "yes" condition using the address in the SRFL to locate the address of the next free buffer in the system memory;

f) determining if the buffer is the last on the free buffer list; a "yes" condition notifying the system processor and discarding the cell; a "no" condition updating the SRFL with the pointer from the just obtained buffer;

g) determining if the received cell is the first cell; if not, updating the forward pointer of the just completed descriptor with the system memory address of the just obtained descriptor and placing the cell into the buffer defined by the descriptor; and h) repeating steps (a–g) until the last cell is identified.

17. The method of claim 16 further comprising the steps of:

a) accessing a control memory in the adapter for the received ready list associated with a logical channel related to the cell;

b) updating the descriptor pointed to by the contents of the received ready list register to point to the first descriptor of the current received frame;

c) linking the just received frame to the received ready list;

d) updating the received ready list to point to the last buffer descriptor for the just received frame; and e) returning to step a) for processing the next cell received from the network.

* * * * *